United States Patent [19]

Vickrey, Jr.

[11] Patent Number: 4,457,888
[45] Date of Patent: Jul. 3, 1984

[54] NUCLEAR POISON BOX BASE CONSTRUCTION

[75] Inventor: Richard A. Vickrey, Jr., Windsor, Conn.

[73] Assignee: Combustion Engineering, Inc., Windsor, Conn.

[21] Appl. No.: 351,064

[22] Filed: Feb. 22, 1982

[51] Int. Cl.³ ............................................. G21C 19/00
[52] U.S. Cl. ................................ 376/272; 211/60 R; 206/443; 250/506.1
[58] Field of Search ................... 376/272; 250/506.1, 250/507.1, 518.1; 206/443, 446; 211/60 R, 60 S, 69.1, 128

[56] References Cited

U.S. PATENT DOCUMENTS 4,063,999 12/1977 Wade ................................. 376/272

FOREIGN PATENT DOCUMENTS 5623 11/1979 European Pat. Off. ............ 376/272

Primary Examiner—Harvey E. Behrend
Attorney, Agent, or Firm—Arthur L. Wade

[57] ABSTRACT

A storage box insert for spent nuclear fuel rods has a structure mounted near its lower end to form a support for the rods within the storage box. The support structure comprises five separate steps, or louvers, slanted toward one interior corner of the box. Rods are stacked on the steps and the riser spaces between the steps provide passageways for cooling fluid.

6 Claims, 3 Drawing Figures

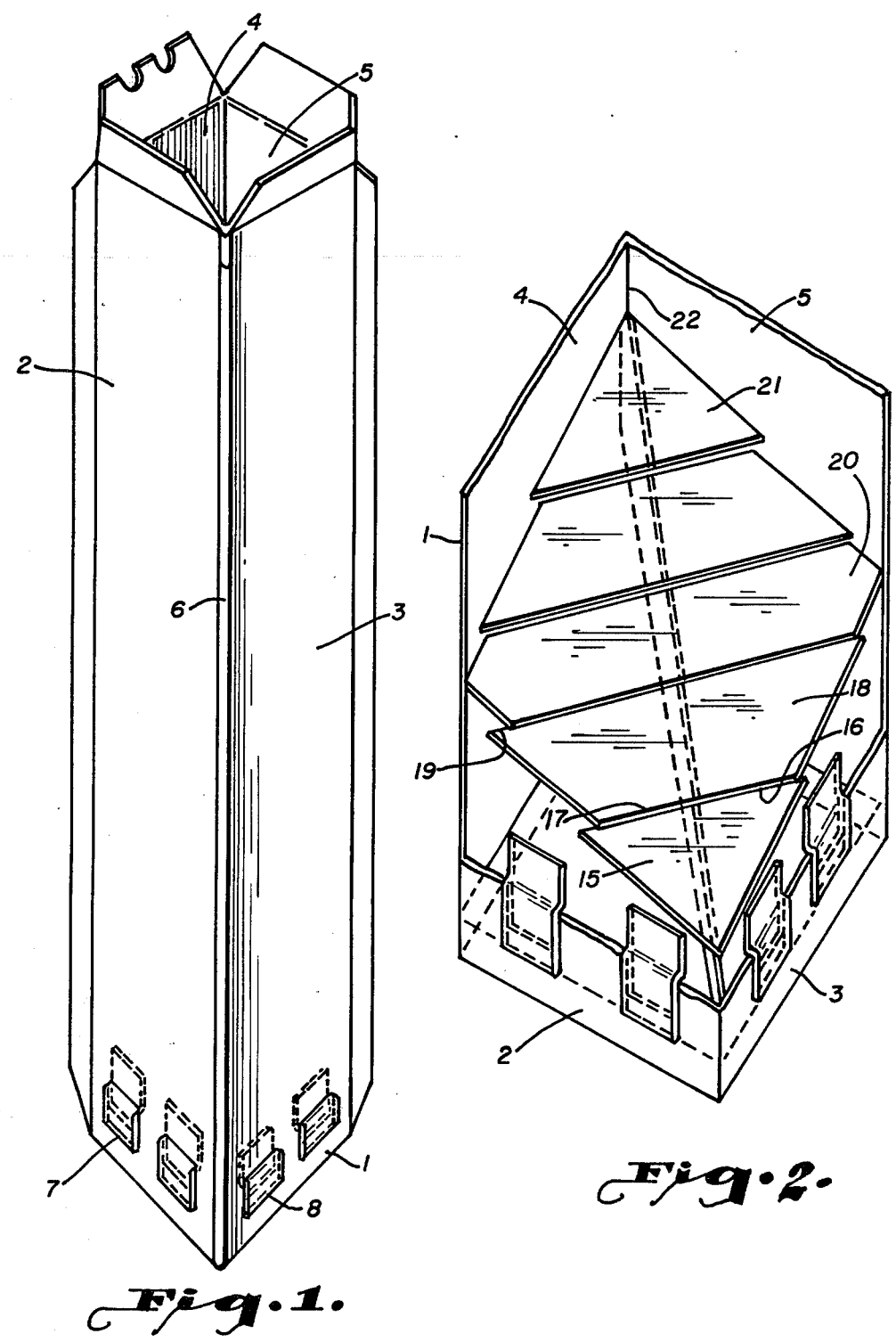

NUCLEAR POISON BOX BASE CONSTRUCTION

TECHNICAL FIELD

The present invention relates to the storage of nuclear fuel rods, or pins, in a box insert which is, in turn, adapted to be held in a framework positioned in a storage facility adjacent a nuclear reactor. More particularly, the invention relates to a base support structure within the box insert which guides and holds fuel pins, or rods, compactly.

BACKGROUND ART

After three years, or more, service, the thin, elongated fuel pins, or rods, of a nuclear reactor often have warp, or distortions, along their lengths. It is now contemplated to store these fuel rods of the assemblies, individually. Once the fuel rods are removed from their assemblies, their arrangement and support in the poison storage boxes has distinctive problems.

Concern for the storage provisions for spent nuclear fuel assemblies is found in at least U.S. Pat. No. 4,177,385, Bevilacqua, and U.S. patent application Ser. No. 142,585 filed Apr. 21, 1980. These prior disclosures explore the problems, and their solutions, of providing box inserts in storage racks for complete fuel assemblies. The boxes may be poisoned with various arrangements and provided with flux traps within their storage rack. The fundamental objective is to store the spent fuel for a significant decay time, awaiting ultimate disposal. With all the concern for the construction of the box inserts, their vertical suspension in the storage rack, and the provision of poison arrangements, there has been no prior contemplation of reducing the size of the storage, or increasing its capacity, by breaking down the fuel rod assembly and transferring the individual rods into the box in a more compact arrangement than in the fuel assembly.

There is need for a base plate construction at the lower end of the storage box insert which will not only support the fuel rods, vertically, but which will inherently organize the rods laterally into a compact body. This base plate construction not only provides support and organization of the fuel rods, but allows circulation of cooling water through the length of the storage box insert. Further, the construction of the base plate must provide for its remote insertion into existing forms of storage box inserts and permanent installations of the bases when boxes are initially assembled.

DISCLOSURE OF THE INVENTION

The present invention contemplates a base structure mounted in the lower end of a storage box insert and comprising steps, or louvers, the risers between steps being open to the flow of cooling fluid through the length of the box and over fuel rods stored in the box.

The invention further contemplates that the lower of the louvers, or steps, be mounted within the box to slant downward toward one interior corner formed by two interior walls of the box. This lower louver, or step, terminates below the edge of a second louver, or step, which extends across the box between the internal walls. A third louver, or step, extends downward from the side walls of the box in the same relationship as the first and second louvers. The stepping of louvers continues until the plan of the box interior has been completely filled to present a complete base surface to fuel rods lowered into the box from above the base surface. Finally, the riser space between louvers, or steps, is open to provide passageways for cooling fluid flowing the length of the box interior and over the rods in control of the heat generated by the fuel rods.

Other objects, advantages and features of this invention will become apparent to one skilled in the art upon consideration of the written specification, appended claims, and attached drawings.

BRIEF DESIGNATION OF THE DRAWINGS

FIG. 1 is a perspective of a poison box insert as positioned in a storage rack to retain fuel rods on a base structure embodying the present invention;

FIG. 2 is a sectioned perspective of the lower part of the box of FIG. 1 showing the base structure.

BEST MODE FOR CARRYING OUT THE INVENTION

Figure 3:
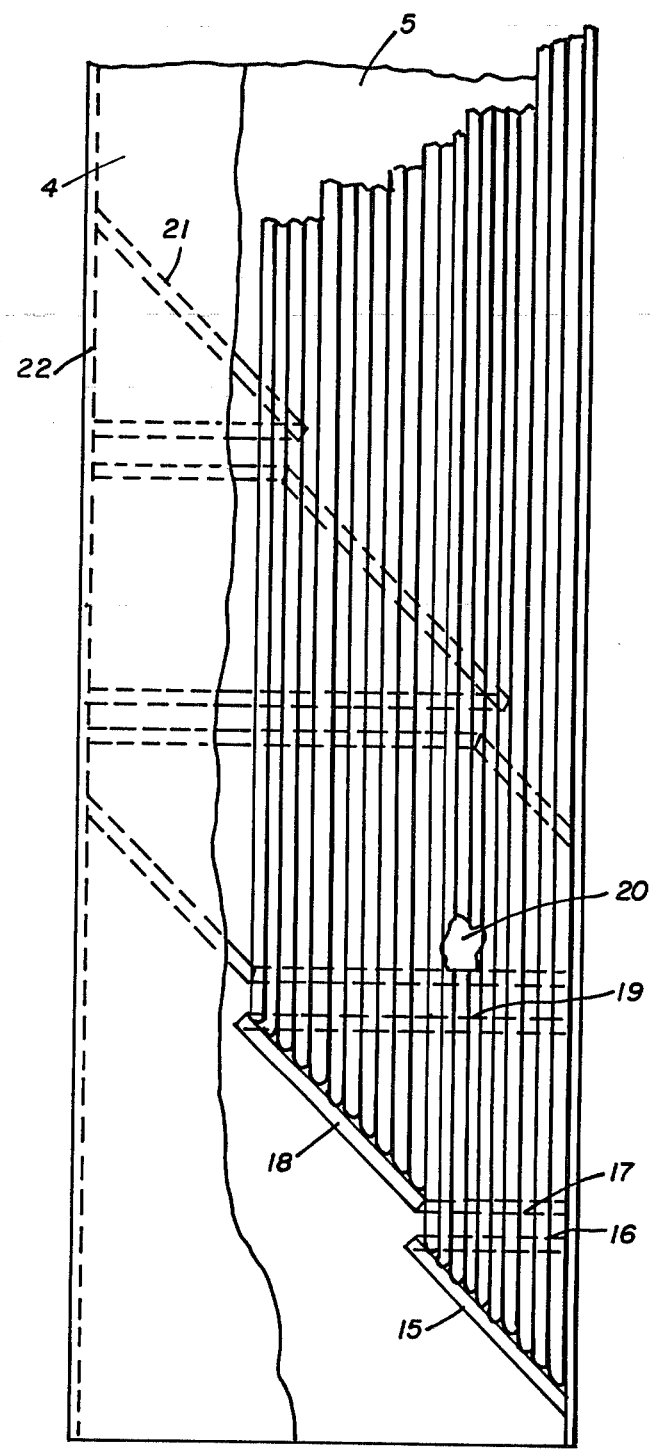
FIG. 3 is a sectioned side elevation of the base structure of FIG. 2 showing the fuel rods stacked upon the base structure.

FIG. 1 discloses a poison box insert 1 as it is transported to, and inserted down into, a cell of a storage rack. Containing spent nuclear fuel rods, or pins, this storage box is retained in under-water storage for the length of time necessary to decay the nuclear fuel prior to disposal. The preferred form of the box, in cross section, is square and is made up of simple elongated panels 2, 3, 4 and 5. As viewed in FIG. 1, panels 2 and 3 form an interior corner 6. The complete box is suspended in its rack from flared upper tabs. The present embodiment of the invention is evidenced by spring tabs 7 and 8 protruding from holes in the lower part of panels 2 and 3.

FIG. 2 discloses the lower portion of box 1 sectioned by removal of sides 2 and 3 at the level of the base structure embodying the present invention. The base structure can now be seen to comprise a series of louvers, or steps, the lower of which is wedge-shaped to form a juncture with the interior corner 6 of the box.

The base structure is disclosed in FIG. 2 as specifically comprised of five louvers, each slanted downward toward the juncture of the lowest louver and the interior corner 6. All louvers are connected and positioned, as a unit, within the box at its lower end. The base structure unit can be thrust down the box from its upper end, or pulled up into the box through the lower end. Preferably, the unit is pushed downward until tabs 7 and 8 are opposite their respective holes in the walls of the side panels. These tabs, essentially leaf hooks, pop out their respective holes and anchor the base unit in position. This tab-hole arrangement for anchoring the base structure in the lower end of box 1 may be used to install the base structure when the box is already positioned within its rack. Alternatively, when the box is initially constructed, the base structure can be welded to the internal walls of the panels to mount the base structure, as disclosed in FIG. 2.

Regardless of how the base structure, as a unit, is installed, the lower louver, or step, 15 is fitted as a triangular wedge-shaped member to the interior corner 6. The upper edge 16 of step 15 terminates just under the forward edge 17 of the next higher step 18. Second step 18 extends between the internal walls of panel 2 and 3, extends its front edge 17 over the surface of the lower step 15, and extends its upper edge 19 up to, and slightly under, upper step 20. The step arrangement continues until the last of the steps 21 is fitted into the corner 22 formed by the intersection of panels 4 and 5. The result, in plan view, is a continuous base surface formed by the steps between corner 22 to corner 6. Therefore, any rod lowered into the box 1 from above will have its end brought against the slanting surface of the base structure which will urge the rod to descend toward the lowest point on this surface, which is the juncture of interior corner 6 and step 15.

FIG. 3 is a sectioned side elevation of FIG. 2 taken to show in detail how the fuel rods are placed on the various steps of the base structure. The initial fuel rod is positioned along the intersection of panels 2 and 3, its end resting on the surface of step 15. Following rods, placed up against the first rod, form a line between the internal surface of panels 2 and 3. The rods, then, are clustered around the initial rod until their sides contact the edge 17 of step 18. Subsequent rods rest on step 18 and against the preceding cluster of rods resting on step 15. Progressively, the rods are sequentially clustered on the surfaces of the steps until step 21 is reached. Step 21 is then filled until the last rod stored in box 1 lies in the corner 22 of panels 4 and 5.

Conclusion

It should now be apparent from the disclosure that the open-ended, vertically suspended nuclear fuel storage box is well-developed in the prior art. The container is often termed a box insert because it is nested down into an egg-crate framework for vertical suspension in the storage area. The ultimate objective of the present invention is to pack fuel rods independently into the storage box to form a compact accumulation of the stored rods.

The locus of storage initiation within the box is in one of the interior corners. A first, single fuel rod is nested in this interior corner and rods added to the storage are nested down upon the initial fuel rod. The box is tipped toward its interior corner to facilitate the initial rod being placed snugly along the interior corner formed by two of the elongated side panels of the box. The invention is embodied in the base structure within the lower end of the box upon which the lower ends of the rods are supported when the box is vertically suspended in its storage rack.

The base structure is built up from the internal corner of the box with a series of step structures. The upper surfaces of these step structures are all slanted down toward the juncture of the lowest step and the interior corner of the box. Thus, all of the rods bottomed on the step surfaces are urged by the slanted surfaces of the step structures toward the interior corner.

It is necessary that cooling fluid be flowed over the compact collection of fuel rods. Therefore, the steps comprising the base structure will be elevated above one another to provide the riser space between them as flow passages for the cooling fluid the length of the box and over the closely-packed fuel rods. The stepped base construction thereby provides distribution of the cooling fluid up through the box, as well as a support structure which urges all the rods toward the interior corner of the box to form the compact collection of fuel rods. Supported, urged into a compact collection, and cooled, the fuel rods within the box are stored for decay.

The base structure, as a series of steps, can be remotely positioned at the lower end of the box and secured by a fastener means, as illustrated in the disclosure, or permanently welded into position. In either event, the base structure becomes a vital element in control of fuel rods stored within these storage boxes.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

I claim:

1. In a nuclear fuel storage box of polygonal cross-sectional configuration formed of a plurality of vertical side panels joined together along their longitudinal edges, said box being open at the top for insertion of nuclear fuel rods, two of said side panels being joined to form a first elongated interior corner of said box, the improvement comprising a base structure for the lower interior end of said storage box, said base structure including a plurality of steps which substantially cover said lower end and lead from said first elongated interior corner to an opposite interior corner of said box, said steps including
    a first step mounted within said box at its lower end providing an upper surface slanting downward toward the interior corner of the box for receiving the lower end of a fuel rod extended up along said first elongated interior corner,
    and a second step providing an upper surface extending between two interior panel walls of the box and slanted downward toward and terminating a predetermined distance above and over the surface of the first step,
    whereby fuel rods are inserted in the box and supported by the upper surface of the first step and the upper surface of the second step after the surface of the first step is completely occupied.

2. The nuclear fuel storage box of claim 1, in which, the first and second steps are connected together and secured to the lower ends of the panels of the box as a unit.

3. The nuclear fuel storage box of claim 1, including, a plurality of steps slanted toward the surfaces of the first two steps and providing riser spaces vertically between and a predetermined height for the flow of cooling fluid upward through the box and over the fuel rods supported on the upper surfaces of the steps.

4. In a nuclear fuel storage box comprised of four elongated panels joined together in a cross-sectional square configuration for suspension vertically from its upper end in storage, the improvement comprising a base structure for the lower interior end of said storage box, said base structure including a plurality of step members which substantially cover said lower end and lead from a first interior corner to an opposite interior corner of said box, said step members including,
    a wedge-shaped first step member mounted in said first interior corner at the lower end of the box providing an upper surface slanted downward toward the juncture of the first step with the interior corner of the box, and a second step member mounted to extend between the interior walls of the panels forming the corner and slanted downward to terminate a predetermined distance above the surface of the first step, whereby the surfaces of both steps co-act to form a support for a plurality of fuel rods extended down to rest on the surfaces and parallel the box corner while the space between the steps forms a flow path for cooling fluid through the box interior and over the stored fuel rods.

5. The nuclear fuel storage box of claim 4, including, third and fourth and fifth step structures arranged in relationship to each other and the first two step structures to form a complete surface at the lower end of the box to enable the box to be compactly and completely filled with the fuel rods.

6. The nuclear fuel storage box of claim 5, in which, all five steps are connected as a unit and mounted in the lower end of the box.

* * * * *